United States Patent [19]
Kern

[11] Patent Number: 5,777,456
[45] Date of Patent: Jul. 7, 1998

[54] NICAD DEEP CYCLE CHARGING/ DISCHARGING SYSTEM

[76] Inventor: Lynn R. Kern, 1020 N. Sherri St., Ridgecrest, Calif. 93555

[21] Appl. No.: 730,138

[22] Filed: Sep. 30, 1996

[51] Int. Cl.$^6$ .................................................. H01M 10/44
[52] U.S. Cl. .................................... 320/128; 320/125
[58] Field of Search .............................. 320/5, 13, 14, 320/15, 125, 128

[56] References Cited

U.S. PATENT DOCUMENTS

| | | | |
|---|---|---|---|
| 4,140,958 | 2/1979 | Groeschel | 320/14 |
| 4,213,081 | 7/1980 | Taylor | 320/40 |
| 5,182,509 | 1/1993 | Simmonds | 320/14 |
| 5,280,230 | 1/1994 | Mahoney | 320/14 |
| 5,334,925 | 8/1994 | Kendrick | 320/5 |
| 5,355,072 | 10/1994 | Satsuma et al. | 320/13 |
| 5,479,084 | 12/1995 | Satsuma et al. | 320/13 |
| 5,629,600 | 5/1997 | Hara | 320/5 |

Primary Examiner—Peter S. Wong
Assistant Examiner—Gregory J. Toatley, Jr.
Attorney, Agent, or Firm—Melvin J. Sliwka; Stephen J. Church

[57] ABSTRACT

A charging/discharging apparatus uses constant charging current and constant discharging current to reduce the possibility of building memory in the cells of a battery. Memory reduces battery capacity and eventual failure will result since the cells will refuse to take any charge. A charger circuit includes a current source receiving supply voltage to couple constant charging current to the battery and an amplifier is coupled to receive reference voltage from a source and feedback voltage from the battery to connect supply voltage to the current source when the reference voltage is greater than the feedback voltage. A discharger circuit utilizes a current sink receiving supply voltage to couple constant discharging current to the battery. An amplifier receives reference voltage from a source and feedback voltage from the battery to connect supply voltage to the current sink when the reference voltage is less than the feedback voltage. In both charger and discharger applications the current source or current sink maintains a constant current to the battery independently of the magnitude of voltage of the battery. This use of constant current does not rely on battery voltage to charge the cell and can discharge a cell well below the minimum operating voltage. The apparatus is particularly adaptable to recharge NiCad batteries which require specific conditions to properly charge and deep-cycle discharge for maximum life.

15 Claims, 3 Drawing Sheets

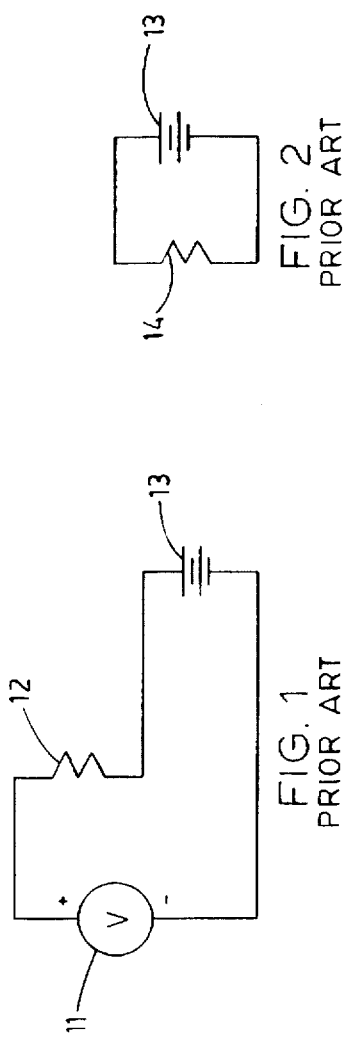
FIG. 1 PRIOR ART
FIG. 2 PRIOR ART
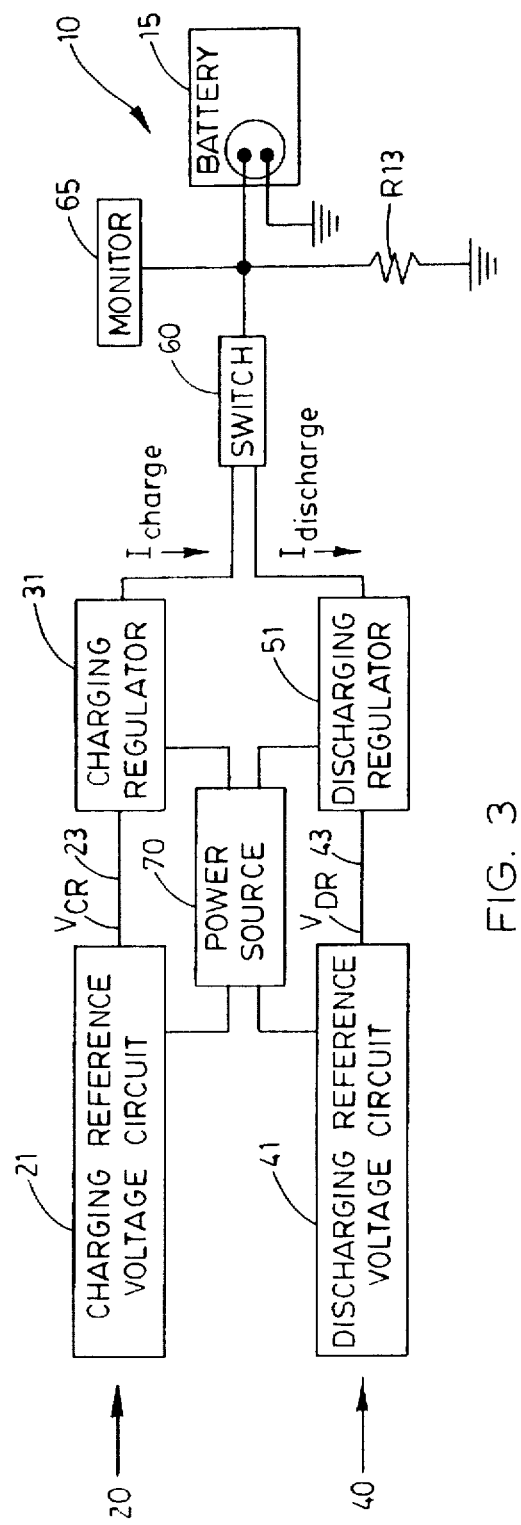
FIG. 3

NICAD DEEP CYCLE CHARGING/ DISCHARGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Rechargeable batteries are advantageous for many reasons. Among these advantages are cost savings, convenience, and environmental impact that make this practice widespread. However, recharged batteries sometimes fail to come up to expectations. In particular, NiCad rechargeable batteries require specific conditions to properly charge and to deep-cycle discharge the cells for maximum cell life. A recurring problem is they have poor shelf life after they were thought to be fully charged. Sometimes, the batteries would completely fail within minutes after operation in a field application.

A typical charger for charging NiCad batteries uses a simple transformer-type AC adapter to charge the cells. Before charging, however, the routine practice was to use the batteries until they quit. Unfortunately, this practice built "memory" in the cells of the battery. Memory is undesirable and in a NiCad battery it manifests itself in the crystallization of some cells after improper use. That is to say, a salt bridge is built within the battery that resists charging and discharging beyond particular potentials.

Memory would be created because the batteries were never completely discharged. This is because most batteries have a minimum operating potential well above their minimum battery voltage. In addition, contemporary charging systems have the potential to overcharge and potentially damage the cells. Furthermore, memory can be created when the cell is fully charged since constant current has not been supplied to the cells.

Referring to the drawings, FIGS. 1 and 2 depict a typical prior art charging circuit and discharging circuit, respectively. The charging system of FIG. 1 has power supply 11 connected in series with resistor 12 to battery 13, a NiCad cell. The discharge circuit of FIG. 2 was usually no more than resistor 14 connected in series to battery 13', a NiCad cell. These arrangements create problems due to inherent characteristics of NiCad batteries. NiCad cells achieve their maximum charging voltage very quickly, but have been found to require constant current even after reaching maximum voltage.

The charging current of the circuit shown in FIG. 1 is governed by the following expression:

$$I_{charge} = (V_{power\ supply} - V_{battery})/R_{series} \quad (1)$$

The expression representative of discharging current is:

$$I_{discharge} = V_{battery}/R_{series} \quad (2)$$

From these expressions it is apparent that current (either $I_{discharge}$ or $I_{charge}$) is directly proportional to the battery voltage ($V_{battery}$). In the charging case, as $V_{battery}$ approaches $V_{power\ supply}$, the difference of the two approaches zero, as does $I_{charge}$. Correspondingly, as $V_{battery}$ drops in the discharge circuit, $I_{discharge}$ drops as well. The net result of this charging scheme is that a battery being charged forms memory that resists charging and discharging beyond particular potentials. The effect of this memory is reduced capacity in the cell and eventual failure as the cell will refuse to take any charge. This phenomenon has been noted in many of the cordless appliances used in the home, such as hand tools and cellular telephones, for example.

Thus, in accordance with this invention a need has been discovered for a charger/discharger applying constant current to charge cells and to discharge cells well below their minimum operating voltage so as not to introduce limiting memory.

SUMMARY OF THE INVENTION

The present invention is directed to providing a charger for a battery having a current source that receives supply voltage to couple constant current to a battery being charged. An amplifier coupled to the current source receives reference voltage from a source and feedback voltage from the battery to connect supply voltage to the current source when the reference voltage is greater than the feedback voltage. The current source maintains constant current to the battery independently of the magnitude of the voltage of the battery during charging. A discharger for a battery includes a current sink that receives supply voltage to couple constant current to the battery. An amplifier coupled to the current sink receives reference voltage from a source and feedback voltage from the battery to connect supply voltage to the current sink when the reference voltage is less than the feedback voltage. The current sink maintains a constant current to the battery independently of the magnitude of voltage of the battery to discharge the battery well below the minimum voltage for operation of the battery. A switch may be included to selectively couple the charger and discharger to the battery.

An object of the invention is to provide a circuit providing constant current for charging or discharging a battery.

An object of the invention is to provide a charger/discharger that reduces the possibility of forming memory in battery cells.

Another object is to provide a charger/discharger that does not use changing current to charge or discharge cells.

Yet another object is to provide a charger/discharger that reduces the possibility of diminishing battery capacity.

Another object of the invention is to provide a discharging system that will discharge a cell well below its minimum operating voltage.

Still another object of the invention is to provide a charging system using constant current to charge a battery independent of battery voltage.

Another object of the invention is to provide a discharging circuit using constant current to discharge the battery without relying on the voltage of the battery.

A further object of the invention is to provide a charger/discharger suitable for NiCad batteries.

These and other objects of the invention will become more readily apparent from the ensuing specification when taken in conjunction with the appended drawings and claims.

BRIEF DESCRIPTION OF THE DRAWINGS

FIGS. 1 and 2 are schematic diagrams of prior art charging and discharging circuits, respectively.

FIG. 3 is a block diagram of the charging/discharging apparatus in accordance with this inventive concept.

DESCRIPTION OF THE PREFERRED EMBODIMENT

Figure 4:
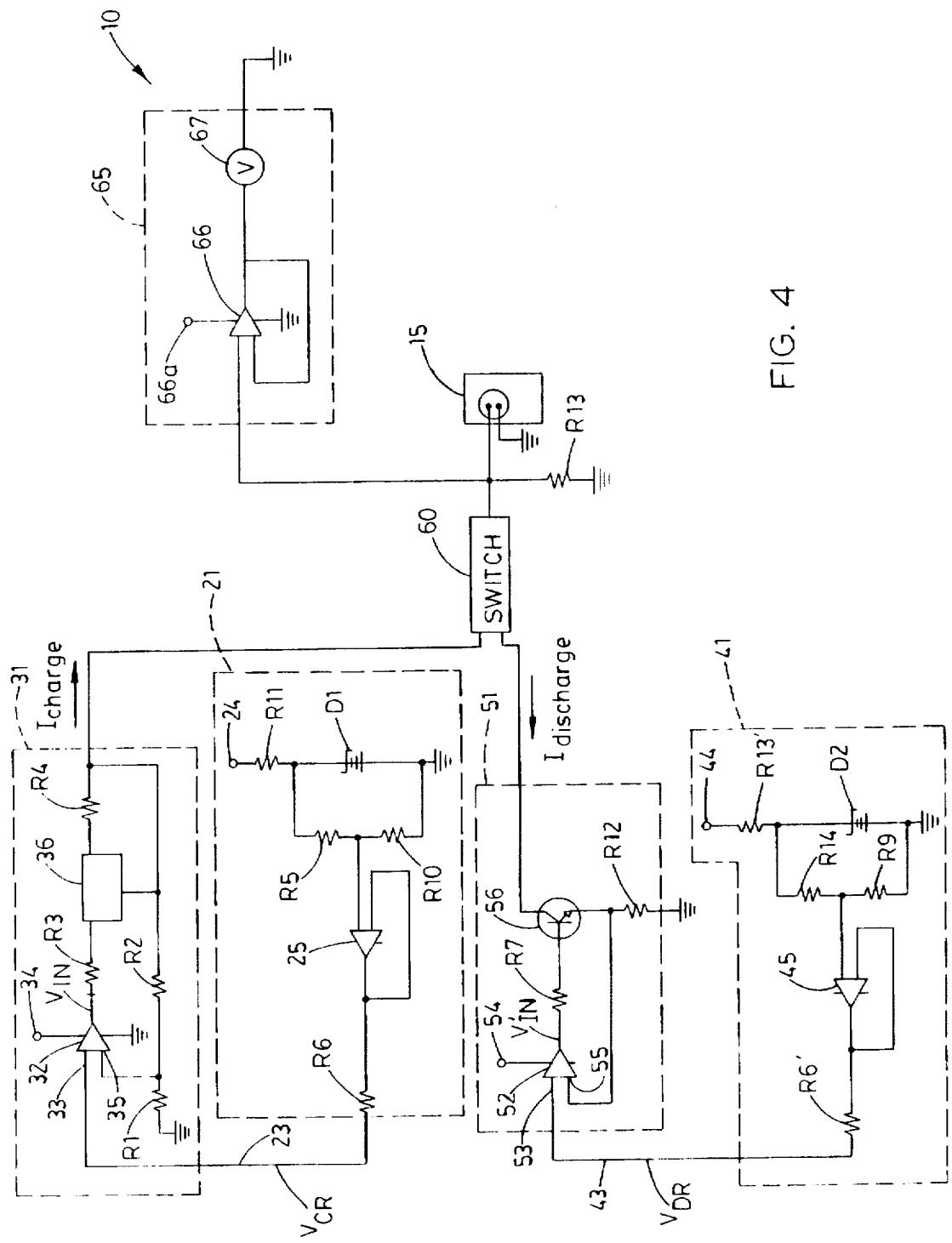
FIG. 4 shows a detailed circuit diagram of the embodiment of FIG. 3.

Referring now to FIG. 3 of the drawings, charging/discharging apparatus 10 reduces the possibility of creating "memory" in battery 15, as it is being charged or discharged. The deleterious effects of memory have been explained above. The present invention avoids these consequential effects of current state of the art techniques. The present invention charges battery 15 with constant current independent of the voltage of the battery being charged or discharges battery 15 with a constant current irrespective of the voltage of the battery being discharged. The improved charging and discharging as provided by this invention have particular application to charging and discharging NiCad batteries.

Apparatus 10 has charging circuit 20 and discharging circuit 40 coupled to battery 15 via switch 60. Monitoring circuit 65 is suitably connected to provide an indication of the discharging and charging of battery 15. Monitoring circuit 65 has an operational amplifier circuit 66 that has a power input 66a connected to power source 70 and meter 67 appropriately connected to assure the monitoring function. Power source circuit 70 creates the proper power level for the charging and discharging of batteries under consideration. Power source circuit 70 is a conventional circuit well within the capabilities of one of ordinary skill in the art and further elaboration is unnecessary to enable a thorough understanding of this inventive concept. In an illustrative embodiment to be elaborated on below, power circuit 70 supplied +15 volts D. C.

Charging circuit 20 has charging reference voltage circuit 21 that generates reference voltage $V_{CR}$ that is coupled to lead 23 and onto charging regulator 31. Charging regulator 31 generates charging current $I_{charge}$ that is constant in magnitude and feeds this current to switch 60. Switch 60 may be selectively actuated to connect charging current $I_{charge}$ from charging circuit 20 to battery 15.

Discharging circuit 40 includes discharging reference voltage circuit 41 that creates discharging reference voltage $V_{DR}$ that is coupled to lead 43 and onto discharging regulator 51. Discharging regulator 51 generates discharging current $I_{discharge}$ that is constant in magnitude and couples this current to switch 60. Switch 60 may be selectively actuated to connect discharging current $I_{discharge}$ from discharging circuit 40 to battery 15.

Appropriate actuation of switch 60 selectively couples battery 15 to charging circuit 20 and discharging circuit 40. This will connect $I_{charge}$ or $I_{discharge}$ to load resistor R13 and battery 15 and charge or discharge battery 15 until a desired level is attained. Monitor 65 visually indicates the charging and discharging levels.

Referring to FIGS. 3 and 4 of the drawings, charging reference circuit 21 has power input terminal 24 connected to receive power from power source circuit 70. This interconnection is schematically shown in FIG. 3 and delivers +15 volts D.C. to charging reference circuit 21. The amount of charging reference voltage $V_{CR}$ from charging reference circuit 21 that is required to charge battery 15 usually is different for each different battery. The constituents of charging reference circuit 21 accommodate different batteries and their charging reference voltages. By way of example, the charging reference circuit has Zener diode D1, an integrated circuit IN756A, connected in series with resistor R11, a 348 Ohm resistor. Resistors R5 and R10 are selected to set the value of the charging reference voltage for a particular battery. This charging reference voltage is transmitted to buffer amplifier 23. In this typical example, resistor R5 is 7.5 Kohms, R10 is 7.40 Kohms and operational amplifier 23 is an integrated circuit LT1079. Serial resistor R6 of about 1.0 Kohm is included and charging reference voltage $V_{CR}$ is connected to charging regulator 31.

Charging regulator 31 has operational amplifier 32 connected to receive charging reference voltage $V_{CR}$ at one input terminal 33. Operational amplifier 32 is, for example, an integrated circuit LT1079 and has its input power terminal 34 connected to power source circuit 70 to receive enabling power, in this case +15 volts D.C. Operational amplifier 32 has its other input terminal 35 coupled to receive a feedback voltage from battery 15 when switch 60 interconnects the battery to charging circuit 20 during charging.

Operational amplifier 32 provides supply voltage $V_{IN}$ to current source 36, via a resistor R3. The current source is a voltage regulator, an integrated circuit LM317, coupled to a resistor R4. R4 functions to define the quantity of charging current $I_{charge}$. In this example, R3 is 100 ohms and R4 is 73.2 ohms. This will produce charging current $I_{charge}$ as expressed:

$$I_{charge} = V_{IN}/73.2 \text{ ohms}$$

where $V_{IN}$ is controlled by operational amplifier 32, which is controlled by $V_{CR}$ from charging reference circuit 21. When the supply voltage $V_{IN}$ is fed to current source 36, current source 36 generates charging current $I_{charge}$ having a constant magnitude irrespective of the voltage on battery 15. The magnitude of $I_{charge}$ is determined by resistor R4. In the example above, with R4 having a value of 73.2 ohms, supply voltage ($V_{IN}$) is connected to current source 36 which supplies a constant 16-milliamp current charge to battery 15. This constant 16-milliamp current charge is independent of the voltage of battery 15. As battery 15 approaches its maximum charge voltage, the current into the battery remains constant while the battery is not fully charged. As battery 15 reaches maximum capacity, feedback voltage from battery 15 rises slightly to force the output voltage of operational amplifier 32 (supply voltage $V_{IN}$) down to essentially turn off current source 36.

In one example the feedback voltage (which is derived from the battery voltage) reached about 4.1 volts D.C. This allows for constant current during charging until battery 15 reached approximately 4.05 volts D.C. At that point, the current tails off until the final voltage is reached.

Selective actuation of switch 60 will switch charging/discharging apparatus 10 from charging circuit 20 to discharging circuit 40. Discharging circuit 40 has its discharging reference voltage circuit 41 coupling discharging reference voltage $V_{DR}$ over lead 43 to discharging regulator 51. Discharging reference voltage circuit 41 has operational amplifier 45 that has power input terminal 44 connecting power from power source circuit 70, in this case +15 volts D.C. Operational amplifier 45, an integrated circuit LT1079, is connected to Zener diode D2, an integrated circuit IN754A, to 148 ohm resistor R13', and to a voltage divider network formed of 2.5 Kohm resistor R14 and 976 ohm resistor R9. This circuit connects a discharging reference voltage that is buffered by amplifier 45. Operational amplifier 45 outputs a signal across 105 Kohm resistor R6', and discharging reference voltage $V_{DR}$ is connected to lead 43 and onto operational amplifier 52 via first input terminal 53. By selection of the values of the components, the magnitude of discharging reference voltage $V_{DR}$ can be selected to discharge different batteries.

Operational amplifier 52 has power input terminal 54 joined to receive power from power source circuit 70. This connection and the other connections to source 70 are not shown in FIG. 3 to avoid needless cluttering of the drawings. Second input terminal 55 of operational amplifier 52 is joined to a feedback voltage loop from battery 15. When switch 60 interconnects battery 15 for discharging, feedback voltage from battery 15 is transmitted through an emitter follower transistor circuit including transistor 56 and resistor R12. Transistor 56, an integrated circuit 7N/222, is connected as an emitter follower with 6 ohm resistor R12 to function as a current sink for completely discharging battery 15.

Discharging of the battery occurs when operational amplifier 52 connects supply voltage $V'_{IN}$ to transistor 56. In this an exemplary embodiment, interconnecting resistor R7 had a value of 397 ohms so that the correct value of supply voltage $V'_{IN}$ reached the base of transistor 56. Under these conditions, transistor 56 conducted a negative current of $I_{discharge}$ from battery 15 to ground via resistor R12.

Discharge circuit 40 operates much in the same way as charging circuit 20. Reference voltage $V_{DR}$ is derived from Zener diode D2 and the divider network made up of R14 and R9 and is buffered by amplifier 52. When battery 15 is connected to transistor 56 through switch 60, amplifier 52 increases supply voltage $V'_{IN}$ until voltage drop across R12 is equal to discharging reference voltage $V_{DR}$ at input terminal 53. One battery that was discharged required that resistor R12 be equal to 6 ohms to create constant discharging current $I_{discharge}$ of 16-milliamps. The constant 16-milliamp constant discharging current $I_{discharge}$, drained battery 15 (NiCad cell) until it reached approximately 100 millivolts, which was well below the minimum value for operation.

In one example until battery 15 reached 150 mV, transistor 56 was turned "on" enough to maintain constant discharging current $I_{discharge}$ to attain a 95 mV drop across R12. Below that point, the transistor reduces the discharge current until the battery reaches 95 mV.

Figure 5:
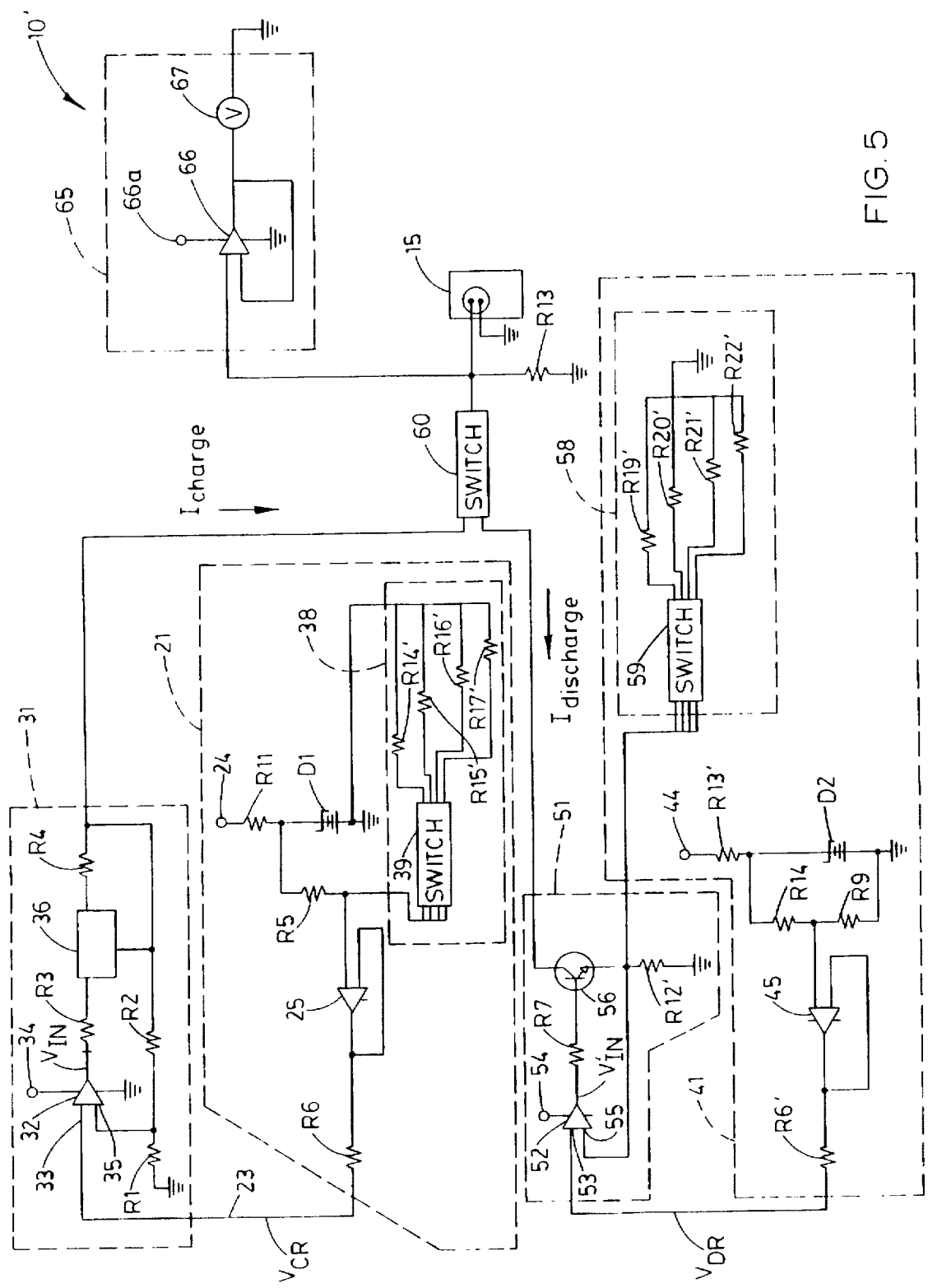
FIG. 5 shows a modification of the invention of FIG. 4 that has resistors coupled by switches to process differently sized batteries and to produce different discharging currents.

FIG. 5 shows a capability for selectively discharging and charging a plurality of different batteries. Parallel resistors R14', R15', R16' and R17' of resistor network 38 are selectively connected into a divider network that also includes resistor R5. An operator need only actuate switch 39 to switch-in the desired resistor R14', R15', R16' and R17' of network 38. This will selectively vary the value of charging reference voltage $V_{CR}$ which is fed to amplifier 32 and current source 36. Constant charging current $I_{charge}$ will be fed to resistor R13 and battery 15 so long as charging reference voltage $V_{CR}$ is greater than the feedback voltage from battery 15.

Discharge circuit 40 has a resistive network 58 of parallel resistors R19', R20', R21' and R22' interconnected by selector switch 59 to resistor R12'. Changing the value of the resistors will change the magnitude of the constant discharging current $I_{discharge}$ to current sink 56. Constant discharging current $I_{discharge}$ will be fed to resistor R12' so long as discharging reference voltage $V_{DR}$ is less than the feedback voltage from battery 15.

During cycle testing, current charging and discharging were observed in which approximately 16 hours were required to complete each half cycle. One test battery has held its voltage at 3.70 volts D.C.

Obviously, many modifications and variations of the present invention are possible in the light of the above teachings. It is therefore to be understood that within the scope of the appended claims, the invention may be practiced otherwise than as specifically described.

I claim:

1. A charger for a battery comprising:
   a current source to receive supply voltage to couple constant current to said battery;
   an amplifier to receive reference voltage from a source and feedback voltage from said battery to connect said supply voltage to said current source when said reference voltage is greater than said feedback voltage; and
   said current source maintains said constant current to said battery independently of the magnitude of voltage of said battery.

2. A charger according to claim 1 whereby said current source is comprised of a voltage regulator and a resistor to provide said constant current, and said amplifier is comprised of a voltage controlled amplifier.

3. A charger according to claim 2 whereby said resistor sets the magnitude of said constant current.

4. A charger according to claim 3 whereby said reference voltage source is comprised of a Zener diode and resistive divider network.

5. A charger according to claim 4 whereby said reference voltage source includes a selector switch connected to a plurality of resistors to selectively provide a plurality of different reference voltages.

6. A discharger for a battery comprising:
   a current sink to receive supply voltage to couple constant current to said battery;
   an amplifier to receive reference voltage from a source and feedback voltage from said batters to connect said supply voltage to said current sink when said reference voltage is less than said feedback voltage; and
   said sink maintains said constant current to said battery independently of the magnitude of voltage of said battery.

7. A discharger according to claim 6 whereby said reference voltage is less than the minimum voltage for operation of said battery.

8. A discharger according to claim 6 whereby said current sink includes an emitter follower connected to at least one resistor to set the value of said constant current.

9. A discharger according to claim 8 whereby said reference voltage source is comprised of Zener diode and resistive divider network.

10. A discharger according to claim 9 whereby said current sink includes a selector switch connected to a plurality of resistors to selectively provide a plurality of different constant discharging currents.

11. A charging/discharging apparatus for a battery comprising:
   a charger to connect a constant charging current to said battery until a first reference voltage from a source is greater than a first feedback voltage from said battery;
   a discharger to connect constant discharging current to said battery until a second reference voltage from a second source is less than a second feedback voltage from said battery;
   a switch to selectively couple said charger and said discharger to said battery; and
   said charger includes a current source to receive said first supply voltage to connect said constant charging current to said battery, and a first amplifier to receive said first reference voltage and said first feedback voltage to connect a first supply voltage to said current source;

said discharger includes a current sink to receive a second supply voltage to connect said constant discharging current to said battery, and a second amplifier to receive said second reference voltage and said second feedback voltage to connect said second supply voltage to said current sink.

12. An apparatus according to claim 11 whereby said current source maintains said constant charging current independently of the magnitude of voltage of said battery, and said current sink maintains said constant discharging current independently of the magnitude of voltage of said battery.

13. An apparatus according to claim 12 whereby said current source is comprised of a voltage regulator and a resistor to provide said constant charging current, said first amplifier is comprised of a voltage controlled amplifier, said current sink is comprised of an emitter follower circuit, and said second amplifier is comprised of a voltage controlled amplifier.

14. An apparatus according to claim 13 whereby said first and second reference voltage sources are each comprised of Zener diode and resistive divider networks.

15. An apparatus according to claim 14 whereby said first reference voltage source includes a selector switch connected to a plurality of resistors to selectively provide a plurality of different reference voltages, and said current sink includes a selector switch connected to a second plurality of resistors to selectively provide a plurality of different constant discharging currents.

* * * * *